United States Patent
Dutta et al.

(10) Patent No.: US 12,309,721 B2
(45) Date of Patent: May 20, 2025

(54) METHOD FOR PRIORITIZATION OF SYNCHRONIZATION SIGNALS FOR NR-LTE IN-BAND COEXISTENCE

(71) Applicant: QUALCOMM Incorporated, San Diego, CA (US)

(72) Inventors: Sourjya Dutta, San Diego, CA (US); Shuanshuan Wu, San Diego, CA (US); Kapil Gulati, Belle Mead, NJ (US); Tien Viet Nguyen, Bridgewater, NJ (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/663,203

(22) Filed: May 12, 2022

(65) Prior Publication Data

US 2023/0370982 A1    Nov. 16, 2023

(51) Int. Cl.
  *H04W 56/00*   (2009.01)
  *H04W 72/12*   (2023.01)

(52) U.S. Cl.
  CPC ..... *H04W 56/001* (2013.01); *H04W 72/1215* (2013.01)

(58) Field of Classification Search
  CPC ......... H04W 56/001; H04W 56/00015; H04W 72/1215
  See application file for complete search history.

(56) References Cited

U.S. PATENT DOCUMENTS

| | | | |
|---|---|---|---|
| 11,659,544 B2 * | 5/2023 | Yeo | H04W 72/56 370/329 |
| 2019/0150135 A1 | 5/2019 | Lee et al. | |
| 2020/0229114 A1 | 7/2020 | Ryu et al. | |
| 2022/0174684 A1 | 6/2022 | Liu et al. | |
| 2022/0263612 A1 * | 8/2022 | Pu | H04L 5/005 |

FOREIGN PATENT DOCUMENTS

| | | | | |
|---|---|---|---|---|
| EP | 3860238 A1 * | 8/2021 | | H04W 4/40 |
| WO | 2021027806 A1 | 2/2021 | | |
| WO | 2021088979 A1 | 5/2021 | | |

OTHER PUBLICATIONS

International Search Report and Written Opinion—PCT/US2023/018212—ISA/EPO—Jul. 19, 2023.

* cited by examiner

*Primary Examiner* — Gary Mui
*Assistant Examiner* — Alexander Davila-Wollheim
(74) *Attorney, Agent, or Firm* — Procopio, Cory, Hargreaves & Savitch LLP

(57) ABSTRACT

Method and apparatus for a prioritization of synchronization signals for NR-LTE in-band coexistence. The apparatus detects a first sidelink synchronization signal from a first RAT and a second sidelink synchronization signal from a second RAT. The apparatus determines a priority between a synchronization source associated with the first RAT and the second RAT. The apparatus transmits data using a timing based on a determination of the priority between the first RAT and the second RAT. The apparatus determines to transmit a sidelink synchronization signal to be the synchronization source in response to detecting the first sidelink synchronization signal from the first RAT. The apparatus determines to transmit at least one of the first sidelink synchronization signal or the second sidelink synchronization signal.

25 Claims, 15 Drawing Sheets

METHOD FOR PRIORITIZATION OF SYNCHRONIZATION SIGNALS FOR NR-LTE IN-BAND COEXISTENCE

TECHNICAL FIELD

The present disclosure relates generally to communication systems, and more particularly, to a configuration for a prioritization of synchronization signals for NR-LTE in-band coexistence.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a relay UE. The device may be a processor and/or a modem at a relay UE or the relay UE itself. The apparatus detects a first sidelink synchronization signal from a first radio access technology (RAT) and a second sidelink synchronization signal from a second RAT. The apparatus determines a priority between a synchronization source associated with the first RAT and the second RAT. The apparatus transmits data using a timing based on a determination of the priority between the first RAT and the second RAT.

In an aspect of the disclosure, a method, a computer-readable medium, and an apparatus are provided. The apparatus may be a device at a target UE. The device may be a processor and/or a modem at a target UE or the target UE itself. The apparatus determines to transmit a sidelink synchronization signal as a synchronization source. The apparatus selects to transmit at least one of a first sidelink synchronization signal associated with a first radio access technology (RAT) or a second sidelink synchronization signal associated with a second RAT.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
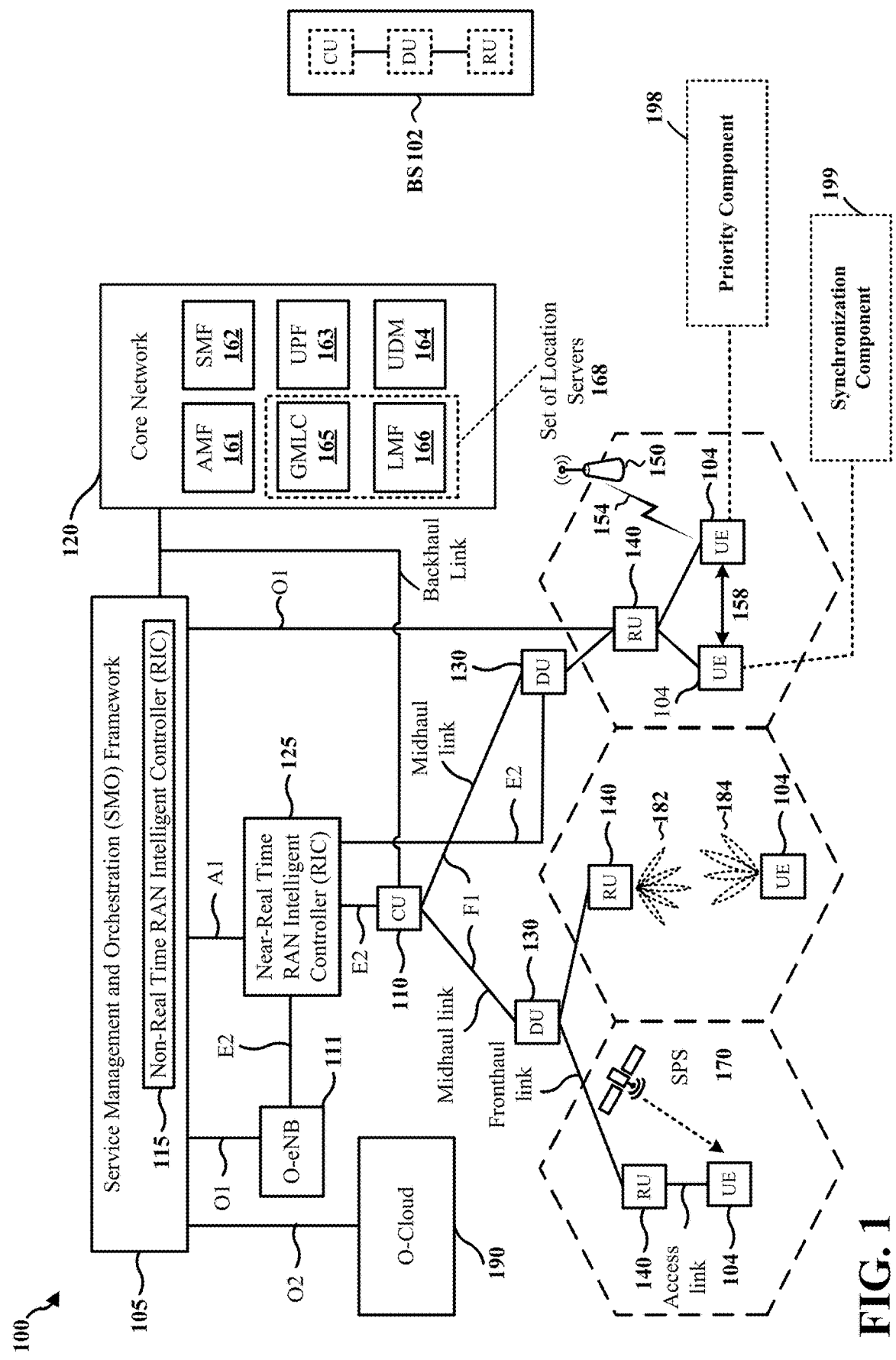
FIG. 1 is a diagram illustrating an example of a wireless communications system and an access network.

In wireless communications, such as sidelink communication, NR V2X and LTE V2X may have to operate in the same channel. NR V2X and LTE V2X may have to operate in the same channel due in part to scarcity of the wireless spectrum. In the absence of a coordination mechanism, NR V2X transmissions may collide with LTE V2X transmissions due to both occupying the same time-frequency resources. The performance of both systems may become degraded as a result of the collisions. In some instances, NR V2X may comprise a dual radio device.

Coordination may comprise a resource pool frame structure, such that NR V2X may access the channel in a time slot and LTE V2X may access the channel in another time slot. However, in order to utilize the resource pool frame structure, both technologies and all of the UEs in the network would have to come to an agreement about a resource pool partition. However, changes in LTE procedures/modem may not be available, such that changes may occur in such a manner that NR devices may implicitly make LTE devices aware of the resource pool partition.

Aspects presented herein provide a configuration for a prioritization of synchronization signals for NR-LTE in-band coexistence. The aspects presented herein may provide a scheme for NR UEs to efficiently prioritize synchronization references and synchronization burst transmissions when both LTE and NR synchronization reference (SyncRef) UEs are in the network. At least one advantage of the disclosure is that an additional priority level may differentiate between NR and LTE SyncRef UEs. At least another advantage is that dual devices (e.g., devices that support both NR and LTE) may have rules to prioritize synchronization signaling based on the set priority rule.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 407 of FIG. 4, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a priority component 198 configured to detect a first sidelink synchronization signal from a first RAT and a second sidelink synchronization signal from a second RAT; determine a priority between a synchronization source associated with the first RAT and the second RAT; and transmit data using a timing based on the determination of the priority between the first RAT and the second RAT.

Referring again to FIG. 1, in certain aspects, the UE 104 may include a synchronization component 199 configured determine to transmit a sidelink synchronization signal as a synchronization source; and select to transmit at least one of a first sidelink synchronization signal associated with a first RAT or a second sidelink synchronization signal associated with a second RAT.

Although the following description may be focused on 5G NR, the concepts described herein may be applicable to other similar areas, such as LTE, LTE-A, CDMA, GSM, and other wireless technologies.

Figure 2:
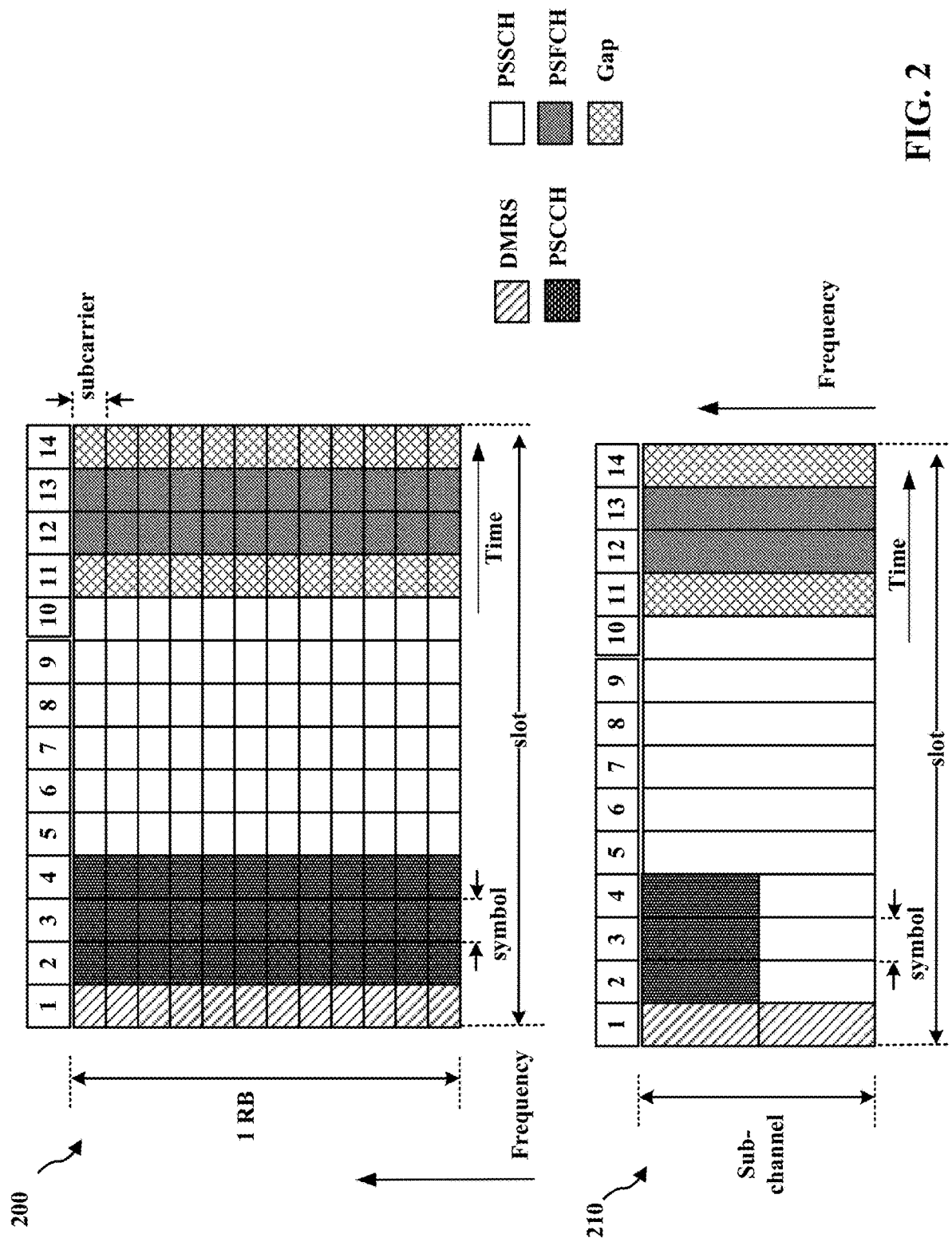
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
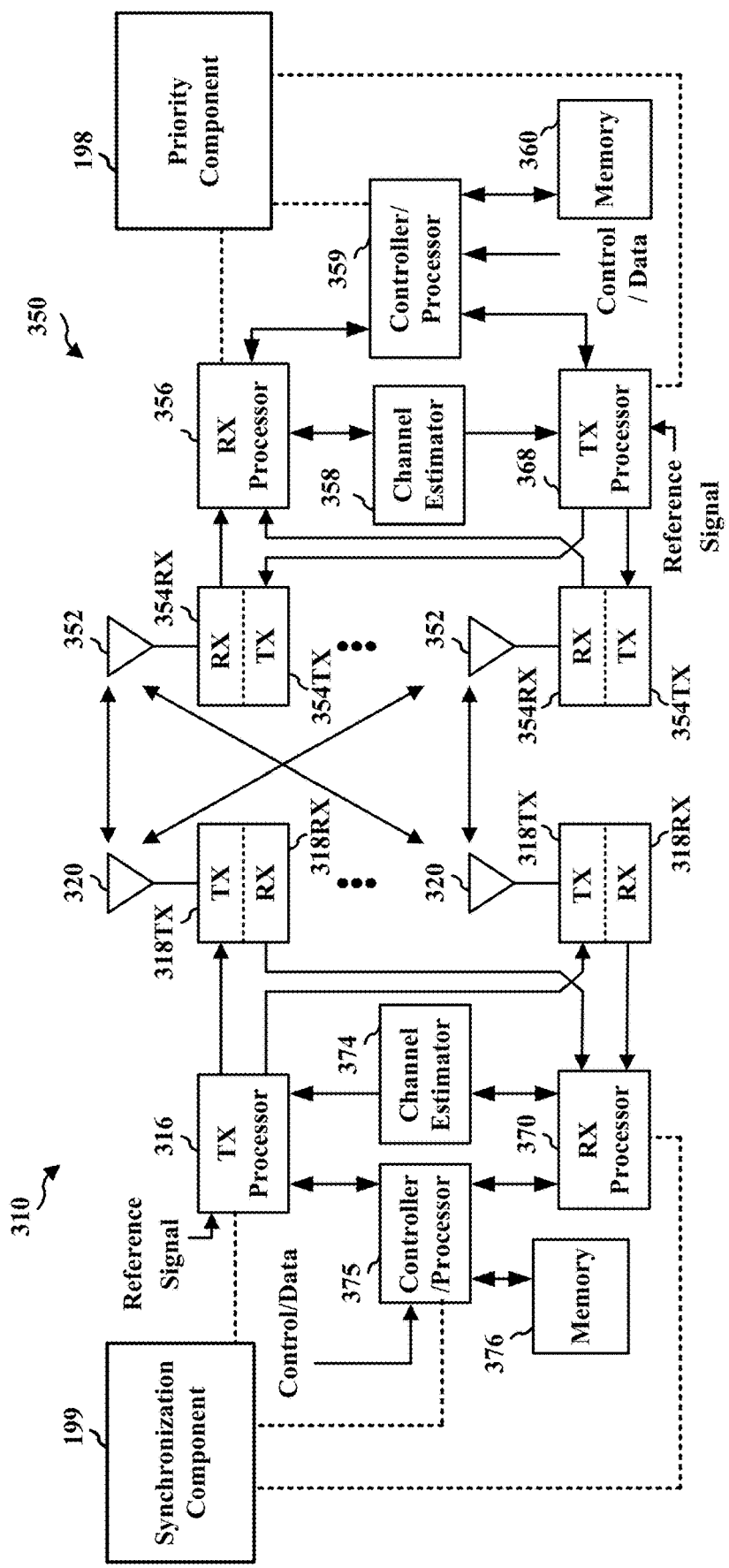
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate a radio frequency (RF) carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358.

The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
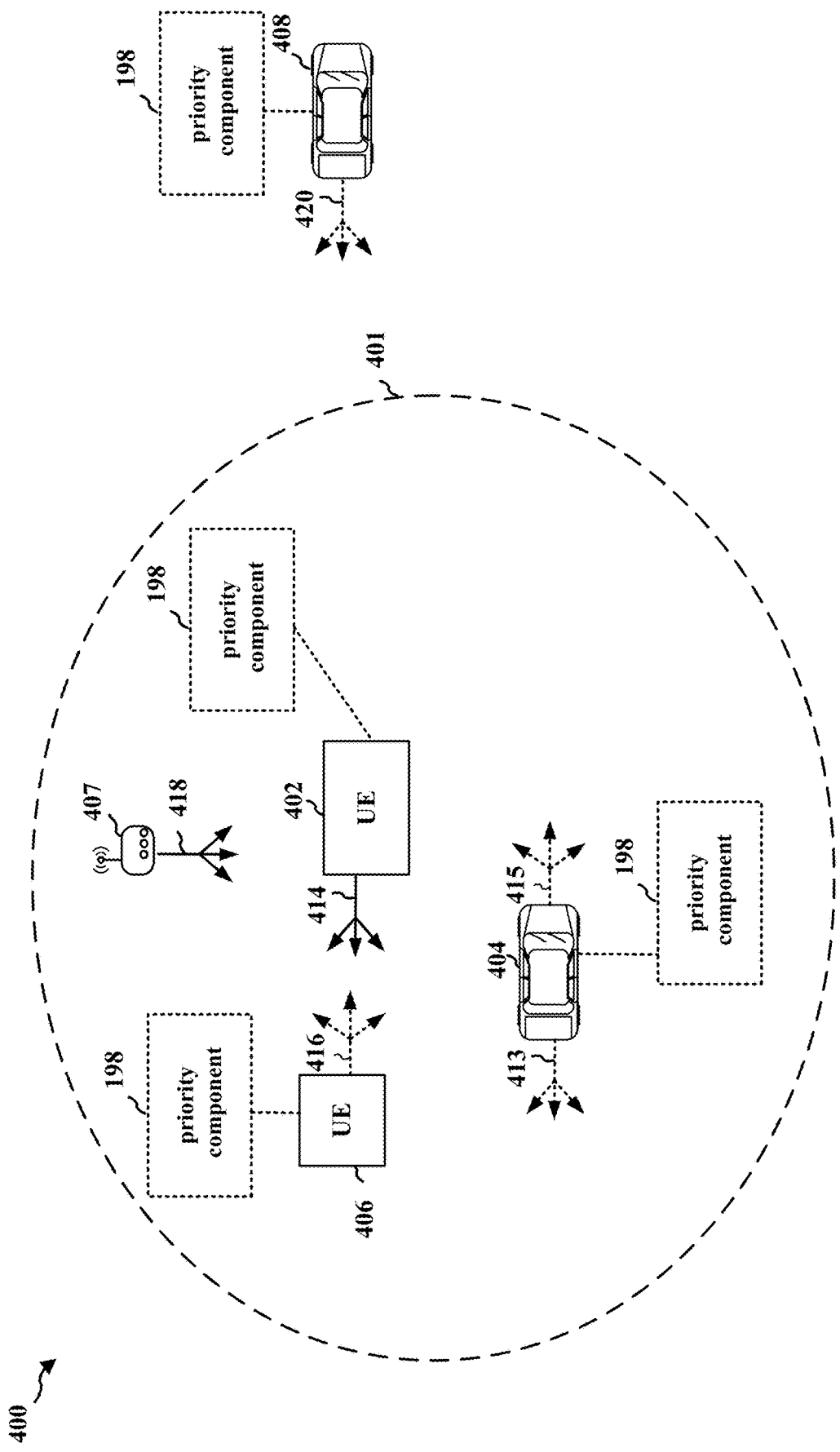
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit sidelink transmissions 413, 415 intended for receipt by other UEs within a range 401 of UE 404, and UE 406 may transmit sidelink transmission 416. Additionally/alternatively, RSU 407 may receive communication from and/or transmit communication 418 to UEs 402, 404, 406, 408. One or more of the UEs 402, 404, 406, 408 or the RSU 407 may comprise a priority component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

In wireless communications, such as sidelink communication, NR V2X and LTE V2X may have to operate in the same channel. NR V2X and LTE V2X may have to operate in the same channel due in part to scarcity of the wireless spectrum. In the absence of a coordination mechanism, NR V2X transmissions may collide with LTE V2X transmissions due to both occupying the same time-frequency resources. The performance of both systems may become degraded as a result of the collisions. In some instances, NR V2X may comprise a dual radio device. The NR V2X dual radio device may be configured to transmit basic safety message (BSM) packets or cooperative awareness message (CAM) packets in LTE V2X, as well as transmitting sensor sharing or other traffic data on NR V2X.

In the simplest form, coordination may comprise a resource pool frame structure, such that NR V2X may access the channel in a time slot and LTE V2X may access the channel in another time slot. However, in order to utilize the resource pool frame structure, both technologies and all of the UEs in the network would have to come to an agreement about a resource pool partition. The resource pool partition would evolve over time as the NR V2X penetration rate increases. The resource pool may also evolve based on changes in traffic over NR or LTE. However, changes in LTE procedures/modem may not be available, such that changes may occur in such a manner that NR devices may implicitly make LTE devices aware of the resource pool partition.

A resource partition between NR and LTE may be utilized in order for NR and LTE to co-exist. At least one manner may include to partition the available bandwidth between LTE and NR, but such manner may not be adaptable to network conditions. For example, in instances where there are more LTE UEs in the system, an equal partition may degrade LTE performance. In some instances, when more NR UEs are present in the system, an equal or fixed partition may prevent NR from using the available radio resources for advanced traffic. An adaptive approach may comprise LTE performing received signal strength indication (RSSI) based ranking of resources, which may back off resources where a measured RSSI is high. NR may estimate a ratio of NR to LTE devices in the system and, based on the NR to LTE ratio, may determine a resource pool partition. NR UEs may transmit on the resources determined for NR and may skip the resources determined for LTE.

Figure 5:
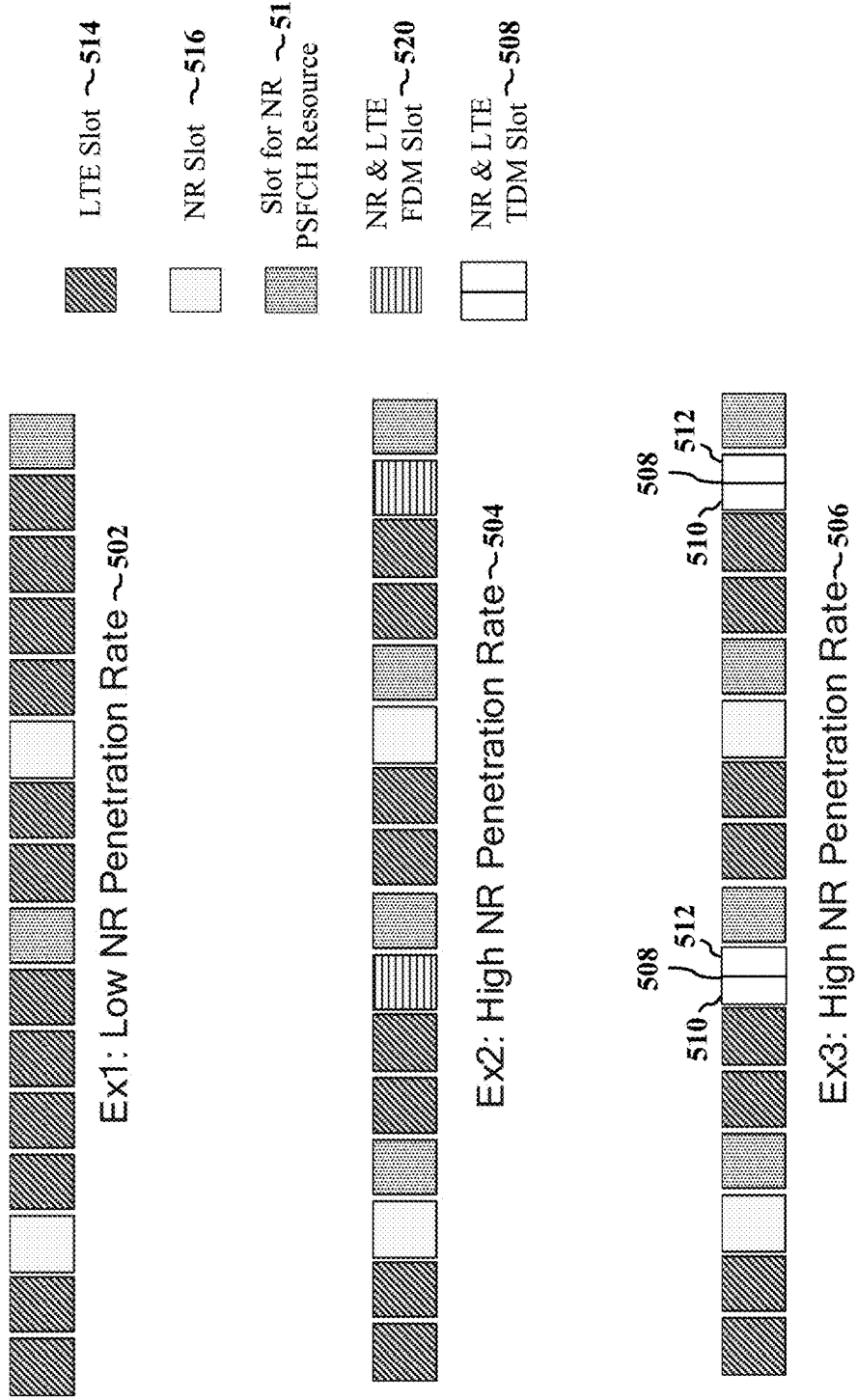
FIG. 5 is a diagram illustrating examples of NR resource pool frame structures, in accordance with aspects presented herein.

FIG. 5 is a diagram 500 illustrating examples of NR resource pool frame structures. The NR resource pool frame structures 502, 504, 506 may comprise LTE slots 514, NR slots 516, NR PSFCH resource slot 518, a NR and LTE frequency domain multiplexed slot 520, or a NR and LTE time domain multiplexed slot 508. In some instances, an NR resource pool frame structure may be determined based on the NR penetration rate, as shown for example in 502 or 504 of FIG. 5. The penetration rate may be the percentage of UEs with NR capability. The penetration rate may be determined by an indication in the LTE sidelink control information or in a MAC-CE indicating that the UE is capable of NR and LTE. In some instances, the penetration rate may be estimated using a channel busy ratio (CBR) or through control and data decoding for both NR and LTE. Each NR device may be configured to adjust the resource pool frame structure based on a recent or latest penetration rate estimation. LTE and NR resources may be time domain multiplexed on some slots or may be frequency domain multiplexed on the same or other slots. For example, NR resource pool frame structure 506, comprises an NR and LTE time domain multiplexed slot 508 where a first half 510 of the slot is for LTE and a second half 512 of the slot is for NR, such that LTE and NR are time domain multiplexed within the slot 508. In some instances, the resource pool pattern may comprise physical sidelink feedback channel resources (e.g., 518) for NR sidelink.

Figure 6A:
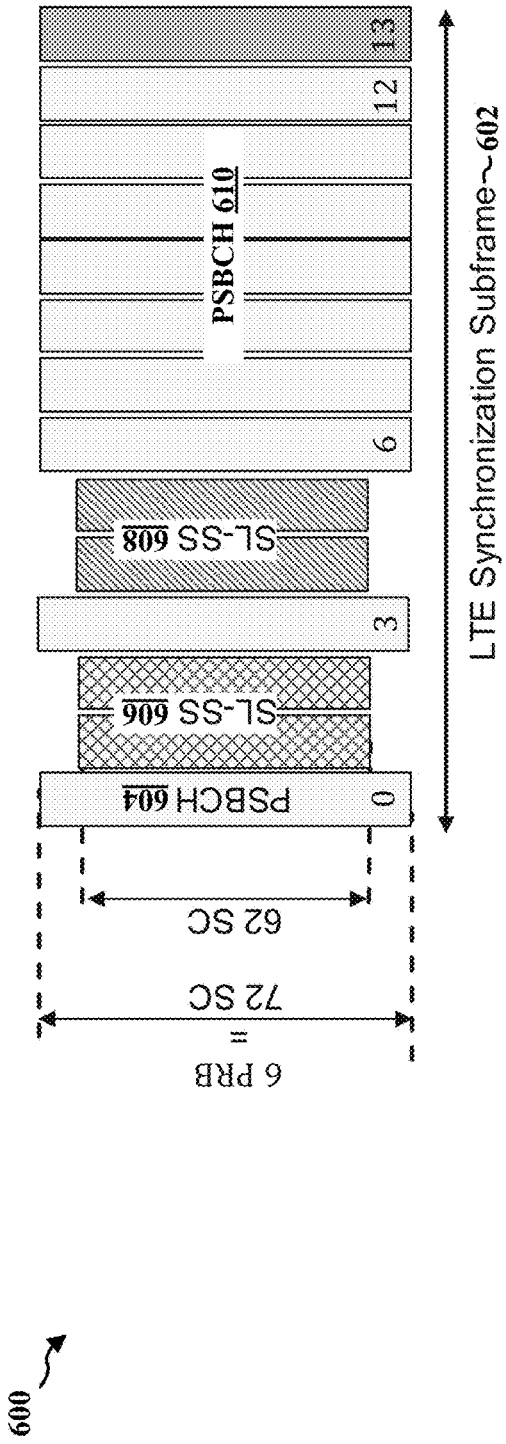
FIG. 6A is a diagram illustrating an example of an LTE synchronization subframe, in accordance with aspects presented herein.

FIG. 6A is a diagram 600 illustrating an example of an LTE synchronization subframe 602. The LTE synchronization subframe 602 may comprise a physical sidelink broadcast channel (PSBCH) 604, 610, and sidelink (SL) synchronization signal (SS) (SL-SS) 606, 608. The LTE synchronization subframe 602 may comprise 2 primary sidelink synchronization signal symbols, 2 secondary sidelink synchronization signal symbols, 3 DMRS symbols for decoding PSBCH, and 1 guard symbol. The transmission bandwidth may comprise 6 PRBs and may have a periodicity of transmissions of 160 ms.

Figure 6B:
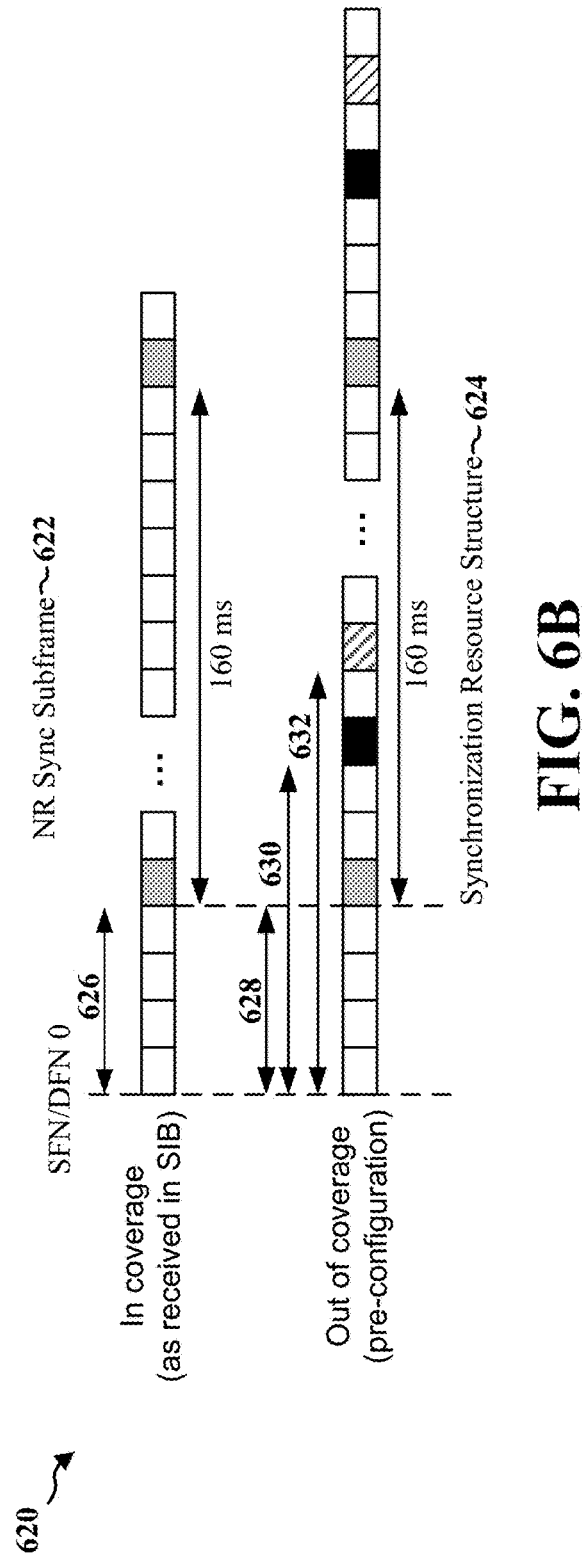
FIG. 6B is a diagram illustrating an example of an NR synchronization subframe, in accordance with aspects presented herein.

FIG. 6B is a diagram 620 illustrating an example of an NR synchronization subframe 622. The NR synchronization subframe 622 may comprise one subframe every 160 ms for in-coverage synchronization, and may comprise two or three subframes every 160 ms for out of coverage synchronization, as shown in synchronization resource structure 624. In some instances, one resource may be configured for in-coverage synchronization using synchOffsetIndicator 626. A network entity may ensure that synchOffsetIndicator 626 is the same as synchOffsetIndicator-1 628 in a pre-configuration. Two or three resources may be configured for out of coverage synchronization, such as, synchOffsetIndicator-1 628, synchOffsetIndicator-2 630, or synchOffsetIndicator-3 632. Synchronization procedure may differ based on whether synchOffsetIndicator-3 632 is configured or not. Synchronization sources may comprise one or more of a base station, GNSS, or a synchronization reference UE (SyncRef UE). A SyncRef UE may have a direct connection with a base station or the GNSS (e.g., 1 hop or indirect (greater than 1 hop), or independent synchronization sources).

Figure 7:
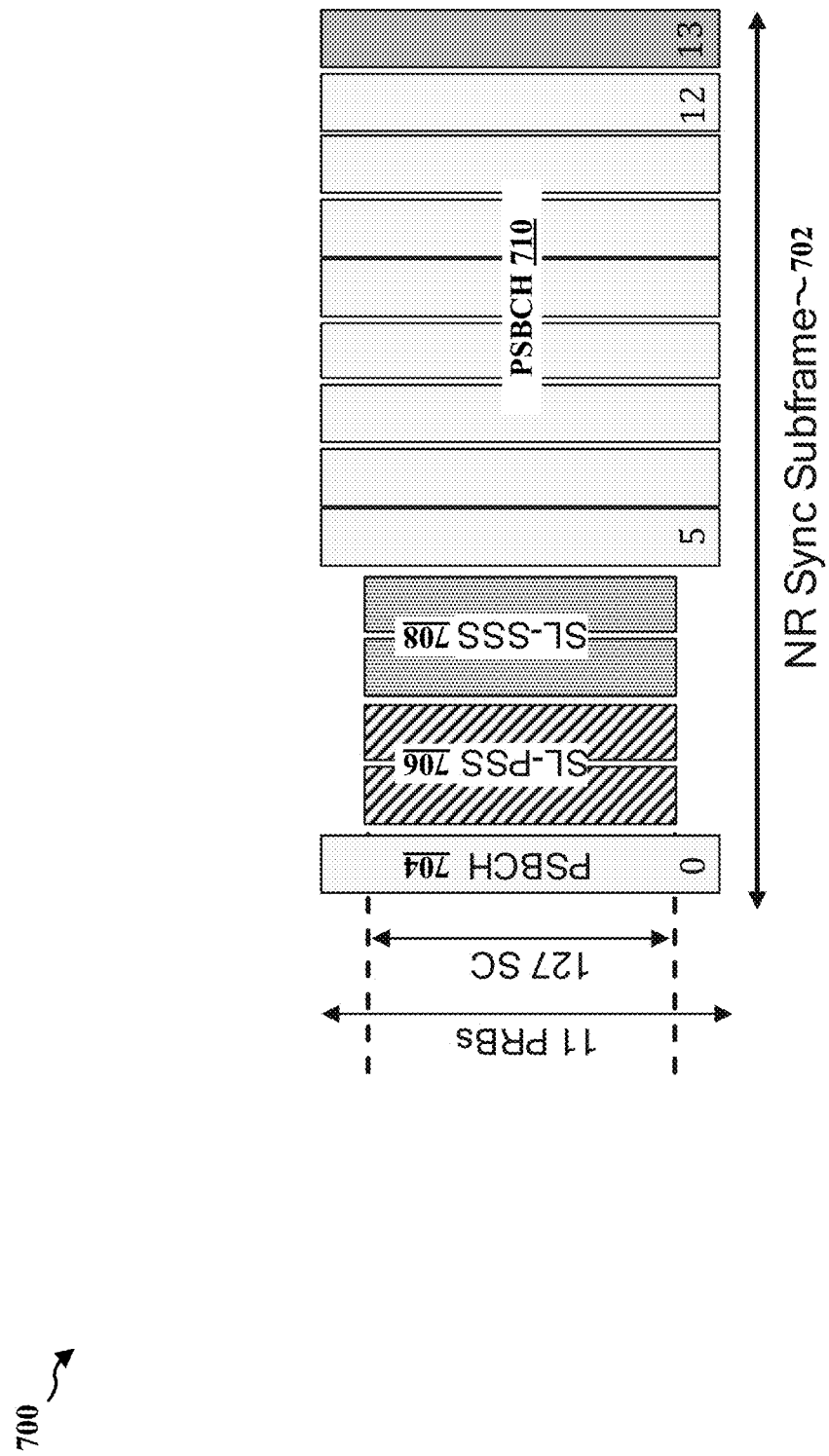
FIG. 7 is a diagram illustrating an example of an NR synchronization subframe, in accordance with aspects presented herein.

FIG. 7 is a diagram 700 illustrating an example of an NR synchronization subframe 702. The NR synchronization subframe 702 may comprise PSBCH 704, 710, SL primary synchronization signal (PSS) (SL-PSS) 706, and SL secondary synchronization signal (SL-SSS) 708. NR uses much of the LTE synchronization procedures. Sidelink synchronization signal identifier (Id) may be based on synchronization reference signal selection, and may provide support for in-coverage, GNSS, and out-of-coverage synchronization, while the synchronization resource location may be indicated by SyncOffset. However, the NR synchronization signal has some differences in comparison to LTE. For example, NR synchronization signal may have different location of synchronization signals in the subframe in comparison to LTE. NR synchronization may reuse NR PSS and SSS used for Uu (e.g., LTE uses Zadoff Chu sequences, NR uses m-sequences like NR PSS/SSS). LTE has a fixed mapping of sidelink synchronization signal subframe in frequency. NR UEs may have a start RB of the synchronization subframe configured or preconfigured.

A sidelink synchronization prioritization may be based on the synchronization source. For example, in instances of in-network coverage with GNSS having the highest priority, the sidelink synchronization priority order may comprise GNSS, a synchronization reference (SyncRef) UE (e.g., synched to GNSS, SLSS ID=0), or a network entity. In instances of out-of-coverage with GNSS having the highest priority, the sidelink synchronization priority order may comprise GNSS, SyncRef UEs directly synchronized to a network entity (e.g., SL SSID=0, INC=1/OR/SL SSID=0, resource=3), SyncRef UEs indirectly synchronized to a network entity (e.g., SL SSID in slss_net, INC=0), SyncRef UEs indirectly synchronized to GNSS via INC UE (e.g., SL SSID=0, INC=FALSE & resource 1 or 2), SyncRef UEs indirectly synchronized to GNSS via out of coverage UE (e.g., SL SSID=169, INC=FALSE), or independent SyncRef UEs.

In instances of in-network coverage with a network entity (e.g., base station) having the highest priority, the sidelink synchronization priority order may comprise the network entity. In instances of out-of-coverage with a network entity having the highest priority, the sidelink synchronization priority order may comprise SyncRef UEs directly synchronized to the network entity (e.g., SL SSID in slss_net, INC=1), SyncRef UEs indirectly synchronized to the network entity (e.g., SL SSID in slss_net, INC=0), GNSS, SyncRef UEs directly synchronized to GNSS (e.g., SL SSID=0, INC=1, or SL SSID=0, resource=3), SyncRef UEs indirectly synchronized to GNSS (e.g., SL SSID=0, INC=FALSE and resource 1 or 2), SyncRef UEs indirectly synchronized to GNSS via an out of coverage UE (e.g., SL SSID=169, INC=FALSE), or independent SyncRef UEs.

Co-channel coexistence between NR and LTE requires time synchronization between LTE and NR devices, otherwise any dynamic mechanism to avoid or minimize collisions may not be feasible. A network may have multiple synchronization sources. In a distributed network, NR and LTE UEs should agree on the same timing. As such, a need exists for a prioritization rule to determine time synchronization without any changes to LTE devices.

Aspects presented herein provide a configuration for a prioritization of synchronization signals for NR-LTE in-band coexistence. The aspects presented herein may provide a scheme for NR UEs to efficiently prioritize synchronization references and synchronization burst transmissions when both LTE and NR SyncRef UEs are in the network. At least one advantage of the disclosure is that an additional priority level may differentiate between NR and LTE SyncRef UEs. At least another advantage is that dual devices (e.g., devices that support both NR and LTE) may have rules to prioritize synchronization signaling based on the set priority rule.

Figure 8:
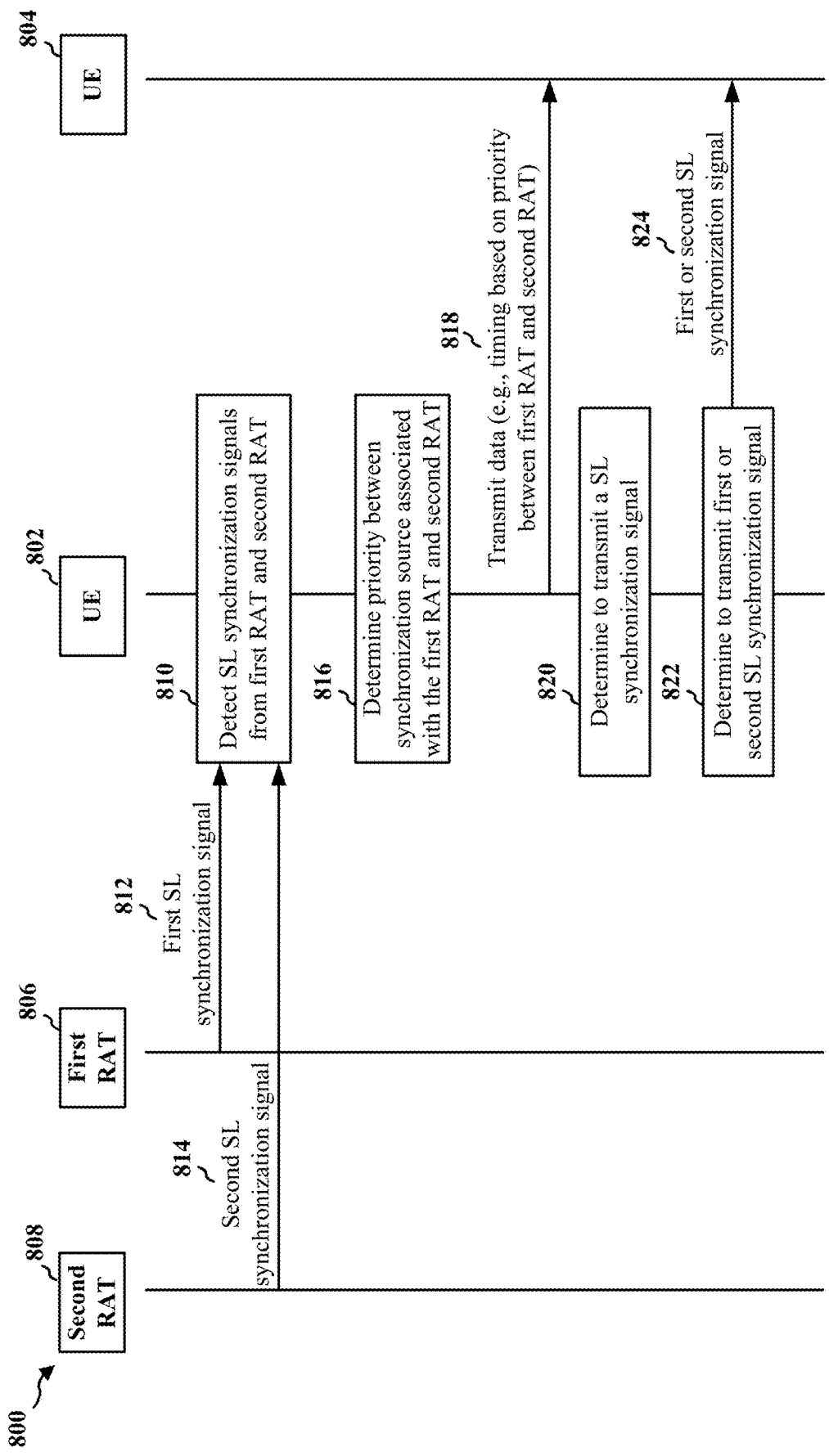
FIG. 8 is a call flow diagram of signaling between a first UE and a second UE.

FIG. 8 is a call flow diagram 800 of signaling between a UE 802 and a UE 804. The UE 802 may be configured to communicate with the base station (not shown). For example, in the context of FIG. 1, the UE 802 may correspond to at least UE 104, the UE 804 may correspond to at least UE 104. In another example, in the context of FIG. 3, the UE 804 may correspond to device 310 and the UE 802 may correspond to device 350.

At 810, the UE 802 may detect a first sidelink synchronization signal from a first RAT. The UE 802 may also detect a second sidelink synchronization signal from a second RAT. For example, the UE 802 may detect the first sidelink synchronization signal 812 from the first RAT 806, and the UE 802 may detect the second synchronization signal 814 from the second RAT 808. In some aspects, the first RAT may comprise LTE, while the second RAT may comprise NR. However, the disclosure is not intended to be limited to the first and second RATs being LTE and NR. In some aspects, the first and/or second RAT may comprise or be associated with any wireless communication network.

At 816, the UE 802 may determine a priority between a first synchronization source associated with the first RAT and a second synchronization source associated with the second RAT. In some aspects, the priority of the first RAT may be higher than the priority of the second RAT. For example, in instances where the first RAT comprises LTE, the first synchronization source may have priority over that of the second synchronization source associated with the second RAT, such that the first sidelink synchronization source is utilized for synchronization. In some aspects, the priority of the first RAT may be preconfigured or configurable.

At 818, the UE 802 may transmit data using a timing based on the determination of the priority between the first RAT and the second RAT. For example, the UE 802 may transmit data to another UE 804 via sidelink using the timing based on the determination of the priority between the first RAT and the second RAT. In some aspects, the timing of the first RAT may be used based at least on the first sidelink synchronization signal of the first RAT. The first sidelink synchronization signal of the first RAT may be derived from the synchronization source with a higher priority than a current synchronization source, where the current synchronization source does not comprise a synchronization reference UE. For example, an LTE sidelink synchronization signal may have a higher priority than the current synchronization source, when the current synchronization sources is not a synchronization reference UE. In some aspects, the timing of the first RAT may be used based at least on the synchronization reference UE being associated with the second RAT. In such aspects, a signal strength of the first sidelink synchronization signal may be greater by a first threshold than a signal strength of a sidelink SSB received from the synchronization reference UE associated with the second RAT. The first threshold may be preconfigured or configurable. For example, in instances where the first RAT comprises LTE and the second RAT comprises NR, if the synchronization reference UE is associated with NR, the signal strength of the LTE sidelink synchronization signal being greater than the sidelink SSB signal strength received from the synchronization reference UE associated with the second RAT. In another example, in instances where both the LTE sidelink synchronization signal transmitter and the NR SSB transmitter are independent synchronization sources, the UE receiving the synchronization signal may make a selection based on the RSRP difference. In some aspects, the timing of the first RAT may be used based at least on the synchronization reference UE being associated with the second RAT. The second sidelink synchronization signal of the synchronization reference UE may be derived from the synchronization source with a priority that is similar or less than the priority of the first sidelink synchronization signal of the synchronization reference UE associated with the first RAT. For example, in some aspects, an SSB sequence ID and/or SSB transmission resources may indicate the source of the synchronization information.

At 820, the UE 802 may determine to transmit a sidelink synchronization signal to be a synchronization source. The UE may determine to transmit the sidelink synchronization signal to be a synchronization source in response to detecting the first sidelink synchronization signal from the first RAT. For example, in instances where the UE comprises an NR UE, the NR UE may determine to become a synchronization source upon detection of an LTE sidelink synchronization signal. In some aspects, the UE may select an LTE UE as its synchronization source.

At 822, the UE 802 may determine to transmit at least one of the first sidelink synchronization signal or the second sidelink synchronization signal. In some aspects, the first sidelink synchronization signal may be transmitted. In some aspects, the second sidelink synchronization signal may be transmitted. In some aspects, the first sidelink synchronization signal and the second sidelink synchronization signal may be based at least on one of a received signal reference power (RSRP) of the first sidelink synchronization signal being less than a threshold, the timing of the second sidelink synchronization signal not being synchronized with the timing of the first sidelink synchronization signal (e.g., NR sidelink SSB is t μs out of sync with the LTE UE timing), a previous timing of the UE not being synchronized with the timing of the first sidelink synchronization signal (e.g., previous timing is $t_0$ μs out of sync with the LTE UE timing), or the UE may be the synchronization source for other UEs.

At 824, the UE 802 may transmit the first sidelink synchronization signal or the second sidelink synchronization signal. The UE may transmit the first sidelink synchronization signal or the second sidelink synchronization signal based on a determination to transmit at least one of the first sidelink synchronization signal or the second sidelink synchronization signal of 822. The UE 802 may transmit the first sidelink synchronization signal or the second sidelink synchronization signal to the UE 804.

Figure 9:
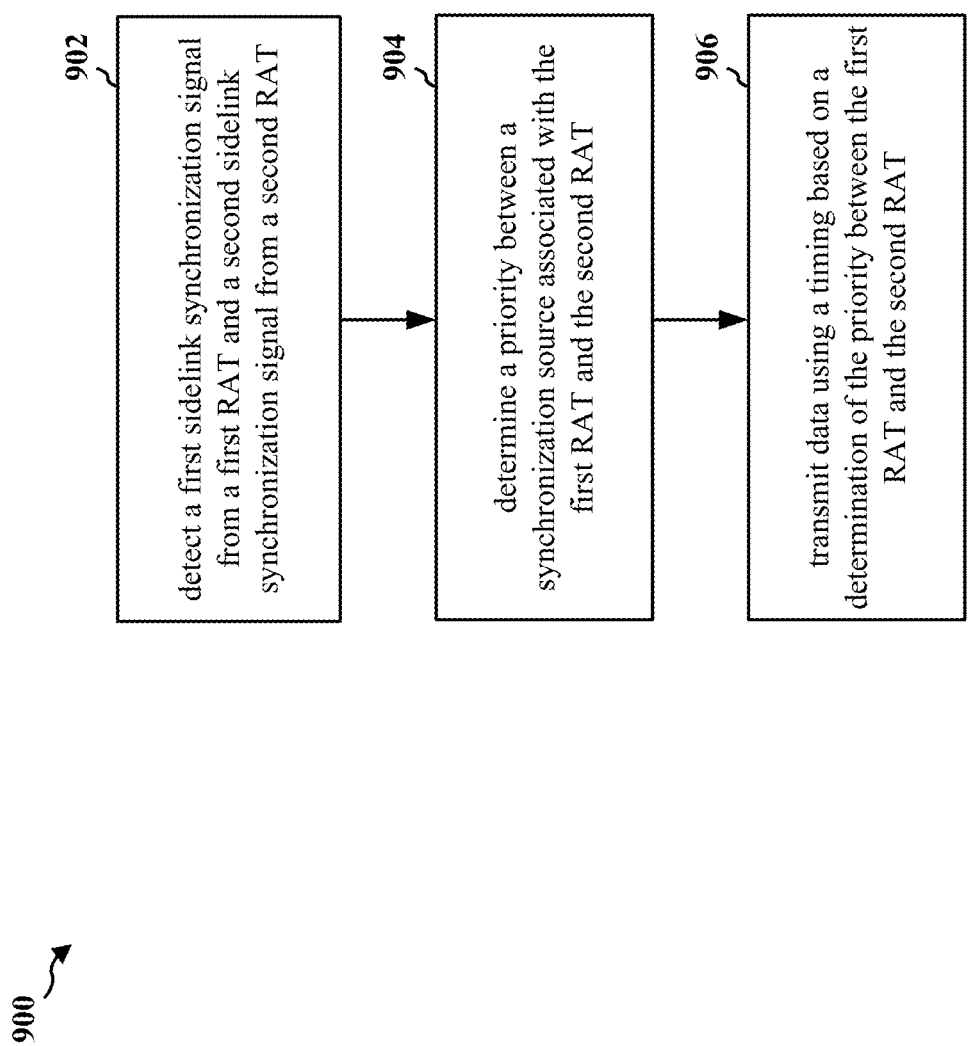
FIG. 9 is a flowchart of a method of wireless communication.

FIG. 9 is a flowchart 900 of a method of wireless communication. The method may be performed by a UE (e.g., the UE 104; the apparatus 1104 of FIG. 11). One or more of the illustrated operations may be omitted, transposed, or contemporaneous. The method may allow a UE to efficiently prioritize synchronization references from different sources.

At 902, the UE may detect a first sidelink synchronization signal. For example, 902 may be performed by priority component 198 of apparatus 1104 of FIG. 11. The UE may detect the first sidelink synchronization signal from a first RAT. The UE may also detect a second sidelink synchronization signal from a second RAT. In some aspects, the first RAT may comprise LTE, while the second RAT may comprise NR.

At 904, the UE may determine a priority between a synchronization source associated with the first RAT and the second RAT. For example, 904 may be performed by priority component 198 of apparatus 1104 of FIG. 11. In some aspects, the priority of the first RAT may be higher than the priority of the second RAT. In some aspects, the priority of the first RAT may be preconfigured or configurable.

At 906, the UE may transmit data using a timing based on the determination of the priority between the first RAT and the second RAT. For example, 906 may be performed by priority component 198 of apparatus 1104 of FIG. 11. The UE may transmit data to another UE via sidelink using the timing based on the determination of the priority between the first RAT and the second RAT. In some aspects, the timing of the first RAT may be used based at least on the first sidelink synchronization signal of the first RAT. The first sidelink synchronization signal of the first RAT may be derived from the synchronization source with a higher priority than a current synchronization source. In some aspects, the current synchronization source may not comprise a synchronization reference UE. In some aspects, the timing of the first RAT may be used based at least on the synchronization reference UE being associated with the second RAT. In such aspects, a signal strength of the first sidelink synchronization signal may be greater by a first threshold than a signal strength of a sidelink synchronization signal block (SSB) received from the synchronization reference UE associated with the second RAT. The first threshold may be preconfigured or configurable. In some aspects, the timing of the first RAT may be used based at least on the synchronization reference UE being associated with the second RAT. The second sidelink synchronization signal of the synchronization reference UE may be derived from the synchronization source with a priority that is similar or less than the priority of the first sidelink synchronization signal of the synchronization reference UE associated with the first RAT.

Figure 10:
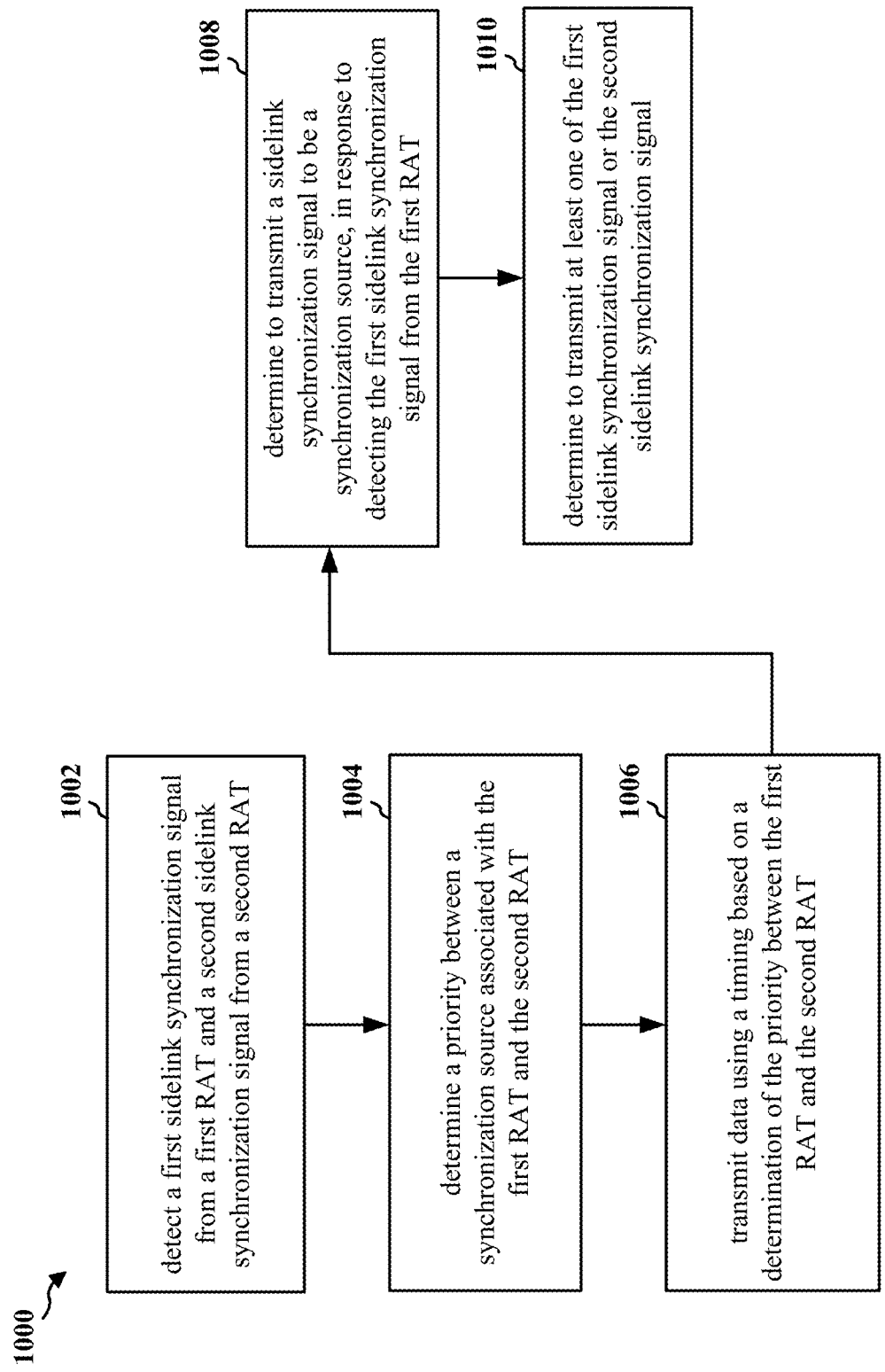
FIG. 10 is a flowchart of a method of wireless communication.

FIG. 10 is a flowchart 1000 of a method of wireless communication. The method may be performed by a UE (e.g., the UE 104; the apparatus 1104). One or more of the illustrated operations may be omitted, transposed, or contemporaneous. The method may allow a UE to efficiently prioritize synchronization references from different sources.

At 1002, the UE may detect a first sidelink synchronization signal. For example, 1002 may be performed by priority component 198 of apparatus 1104. The UE may detect the first sidelink synchronization signal from a first RAT. The UE may also detect a second sidelink synchronization signal from a second RAT. In some aspects, the first RAT may comprise LTE, while the second RAT may comprise NR.

At 1004, the UE may determine a priority between a synchronization source associated with the first RAT and the second RAT. For example, 1004 may be performed by priority component 198 of apparatus 1104. In some aspects, the priority of the first RAT may be higher than the priority of the second RAT. In some aspects, the priority of the first RAT may be preconfigured or configurable.

At 1006, the UE may transmit data using a timing based on the determination of the priority between the first RAT and the second RAT. For example, 1006 may be performed by priority component 198 of apparatus 1104. The UE may transmit data to another UE via sidelink using the timing based on the determination of the priority between the first RAT and the second RAT. In some aspects, the timing of the first RAT may be used based at least on the first sidelink synchronization signal of the first RAT. The first sidelink synchronization signal of the first RAT may be derived from the synchronization source with a higher priority than a current synchronization source, where the current synchronization source does not comprise a synchronization reference UE. In some aspects, the timing of the first RAT may be used based at least on the synchronization reference UE being associated with the second RAT. In such aspects, a signal strength of the first sidelink synchronization signal may be greater by a first threshold than a signal strength of a sidelink SSB received from the synchronization reference UE associated with the second RAT. The first threshold may be preconfigured or configurable. In some aspects, the timing of the first RAT may be used based at least on the synchronization reference UE being associated with the second RAT. The second sidelink synchronization signal of the synchronization reference UE may be derived from the synchronization source with a priority that is similar or less than the priority of the first sidelink synchronization signal of the synchronization reference UE associated with the first RAT.

At 1008, the UE may determine to transmit a sidelink synchronization signal to be a synchronization source. For example, 1008 may be performed by priority component 198 of apparatus 1104. The UE may determine to transmit a sidelink synchronization signal to be a synchronization source in response to detecting the first sidelink synchronization signal from the first RAT.

At 1010, the UE may determine to transmit at least one of the first sidelink synchronization signal or the second sidelink synchronization signal. For example, 1010 may be performed by priority component 198 of apparatus 1104. In some aspects, the first sidelink synchronization signal may be transmitted. In some aspects, the first sidelink synchronization signal and the second sidelink synchronization signal may be based at least on one of a received signal reference power (RSRP) of the first sidelink synchronization signal being less than a threshold, the timing of the second sidelink synchronization signal not being synchronized with the timing of the first sidelink synchronization signal, a previous timing of the UE not being synchronized with the timing of the first sidelink synchronization signal, or the UE may be the synchronization source for other UEs.

Figure 11:
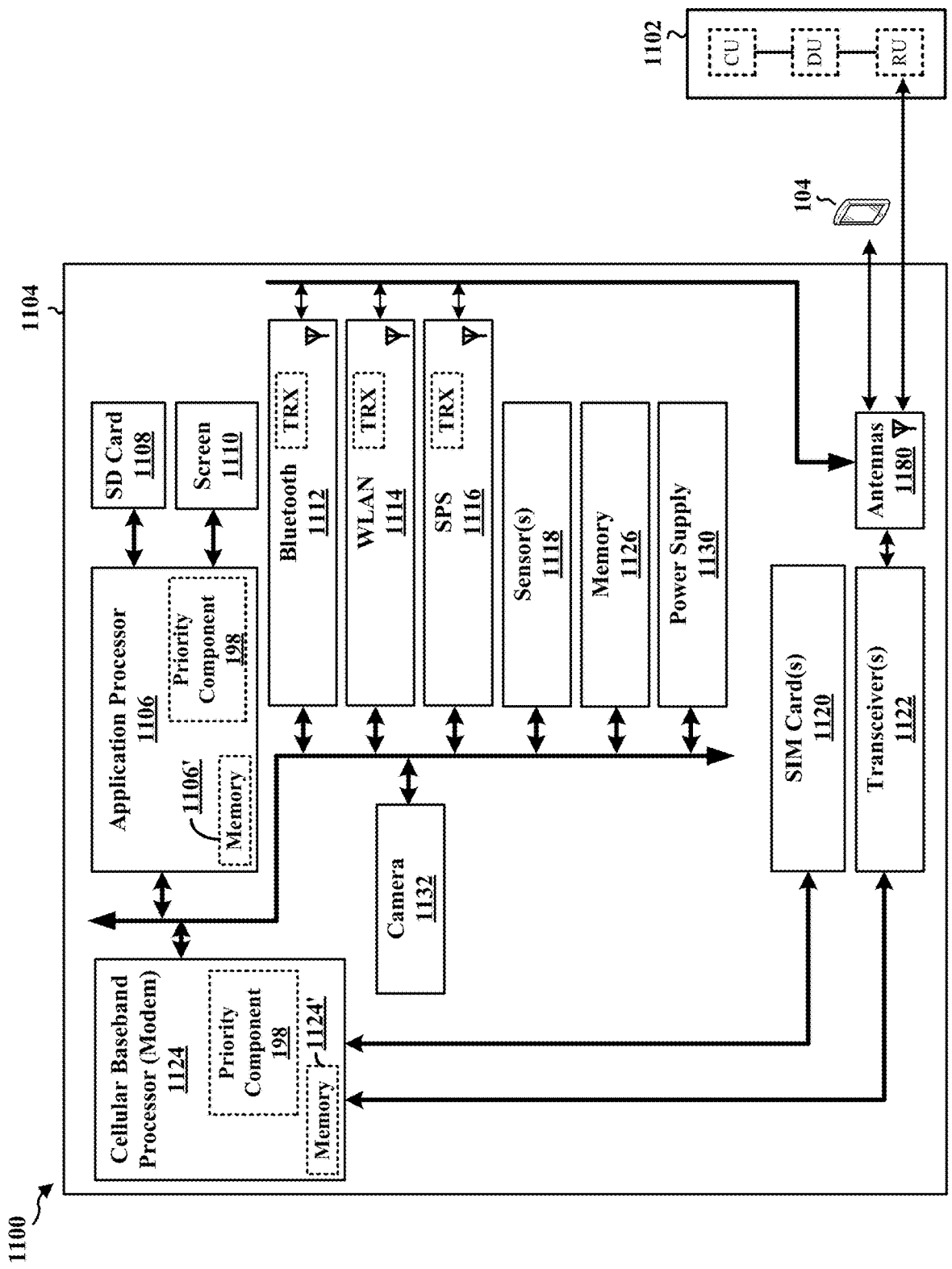
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the device 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to detect a first sidelink synchronization signal from a first RAT and a second sidelink synchronization signal from a second RAT; determine a priority between a synchronization source associated with the first RAT and the second RAT; and transmit data using a timing based on the determination of the priority between the first RAT and the second RAT. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means detecting a first sidelink synchronization signal from a first RAT and a second sidelink synchronization signal from a second RAT. The apparatus includes means for determining a priority between a synchronization source associated with the first RAT and the second RAT. The apparatus includes means for transmitting data using a timing based on the determination of the priority between the first RAT and the second RAT. The apparatus further includes means for determining to transmit a sidelink synchronization signal to be a synchronization source, in response to detecting the first sidelink synchronization signal from the first RAT. The apparatus further includes means for determining to transmit at least one of the first sidelink synchronization signal or the second sidelink synchronization signal. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
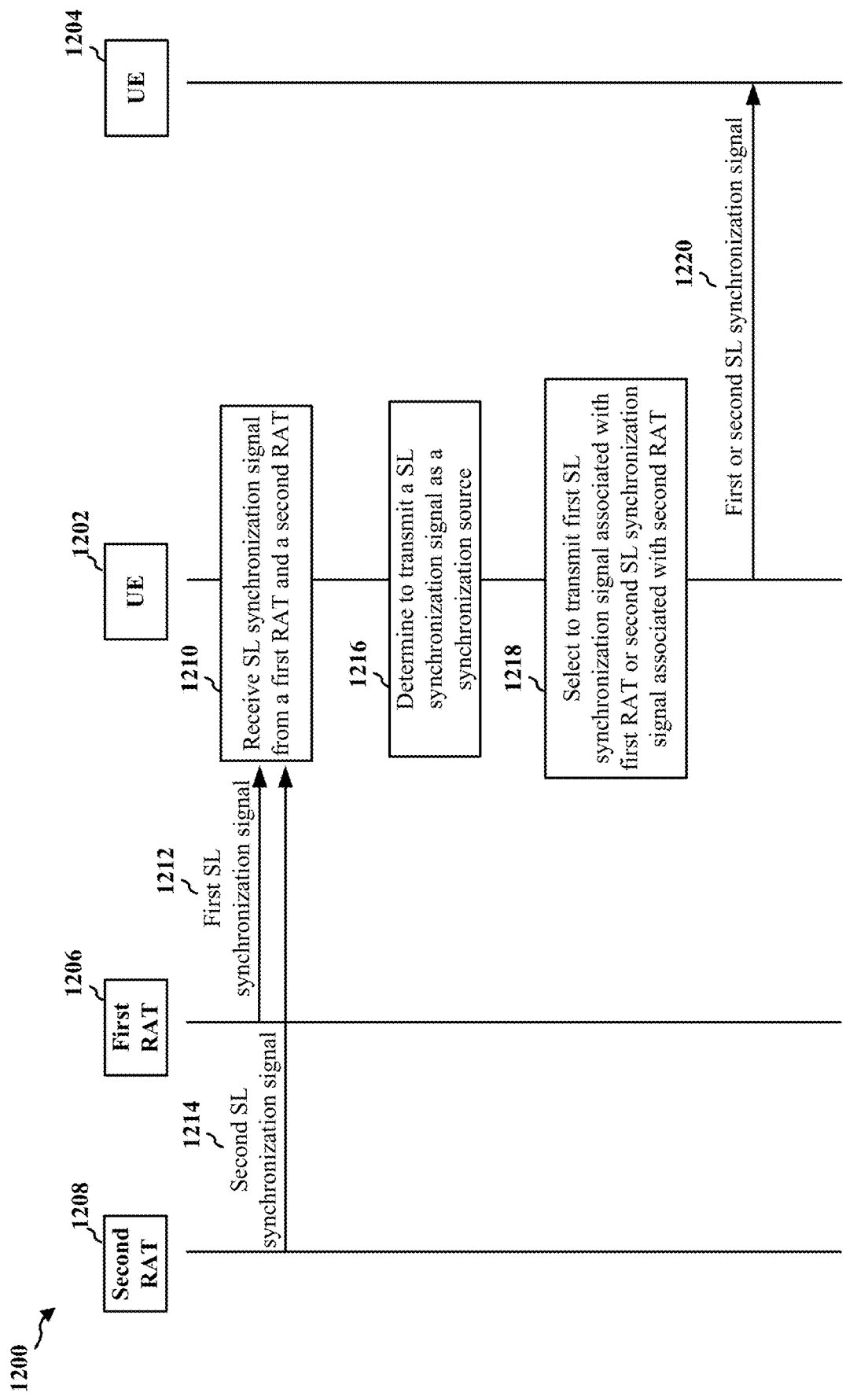
FIG. 12 is a call flow diagram of signaling between a first UE and a second UE.

FIG. 12 is a call flow diagram 1200 of signaling between a UE 1202 and a UE 1204. The UE 1202 may be configured to communicate with the base station (not shown). For example, in the context of FIG. 1, the UE 1202 may correspond to at least UE 104, the UE 1204 may correspond to at least UE 104. In another example, in the context of FIG. 3, the UE 1204 may correspond to device 310 and the UE 1202 may correspond to device 350.

At 1210, the UE 1202 may receive a sidelink synchronization signal from a first RAT and a sidelink synchronization signal from a second RAT. For example, the UE 1202 may receive a first sidelink synchronization signal 1212 from the first RAT 1206, and the UE 1202 may receive a second sidelink synchronization signal 1214 from the second RAT 1208. The sidelink synchronization signal from the first RAT and the sidelink synchronization signal from the second RAT may be from one or more sources. In some aspects, a source of the second RAT may comprise a GNSS, and a source of the first RAT may be from a synchronization reference UE. In some aspects, a timing information derived from the second sidelink synchronization signal associated with the second RAT may be selected for transmission in response to a source of the sidelink synchronization signal from the second RAT having a higher priority. For example, the first sidelink synchronization signal may comprise an NR sidelink SSB and the second sidelink synchronization signal may comprise an LTE sidelink synchronization signal, wherein the UE 1202 may transmit the NR sidelink SSB if the NR sidelink SSB is from a synchronization source having a higher priority, otherwise the UE 1202 may transmit the LTE sidelink synchronization source. In some aspects, a timing information derived from the first sidelink synchronization signal associated with the first RAT may be selected for transmission in response to a source of the sidelink synchronization signal from the first RAT having a higher priority. In some aspects, the second sidelink synchronization signal associated with the second RAT may be selected for transmission. The second sidelink synchronization signal associated with the second RAT may be selected for transmission in response to an estimation of a number of UEs capable of communicating with the second RAT being above a threshold. For example, in instances where the UE 1202 comprises an NR UE, the NR UE may transmit an NR sidelink SSB if an NR penetration rate is above a threshold, where the threshold may be configurable or preconfigured.

At 1216, the UE 1202 may determine to transmit a sidelink synchronization signal. The UE may determine to transmit a sidelink synchronization signal as a synchronization source.

At 1218, the UE 1202 may select to transmit at least one of a first sidelink synchronization signal associated with a first RAT or a second sidelink synchronization signal associated with a second RAT. In some aspects, the first sidelink synchronization signal associated with the first RAT may be selected for transmission. In some aspects, the second sidelink synchronization signal associated with the second RAT may be selected for transmission. The first sidelink synchronization signal associated with the first RAT may be selected for transmission in response to the first sidelink synchronization signal and the second sidelink synchronization signal operating on a same frequency band. For example, in instances where the first sidelink synchronization signal comprises an LTE sidelink synchronization signal and the second sidelink synchronization signal comprises an NR sidelink SSB, the UE transmits the LTE sidelink synchronization signal and does not transmit the NR sidelink SSB. In some aspects, selection of the first sidelink synchronization signal or the second sidelink synchronization signal may be based on a priority of the synchronization source from which the first sidelink synchronization signal and the second sidelink synchronization signal are derived. In some aspects, the first sidelink synchronization signal may be selected for transmission in response to the first sidelink synchronization signal source having a higher timing priority than the second sidelink synchronization signal source. In some aspects, the second sidelink synchronization signal may be selected for transmission in response to the second sidelink synchronization signal having a higher timing priority than the first sidelink synchronization signal. For example, the UE may receive an NR sidelink SSB and an LTE sidelink synchronization signal from different sources, where the source of the NR sidelink SSB comprises a GNSS and the source of the LTE sidelink synchronization signal comprises a synchronization reference UE, such that the UE may transmit the NR sidelink SSB if the GNSS has a higher priority, otherwise the UE transmits the LTE sidelink synchronization signal.

At 1220, the UE 1202 may transmit the first sidelink synchronization signal or the second sidelink synchronization signal. The UE may transmit the first sidelink synchronization signal or the second sidelink synchronization signal based on the selection to transmit the at least one of a first sidelink synchronization signal associated with a first RAT or a second sidelink synchronization signal associated with a second RAT of 1218. The UE 1202 may transmit the first sidelink synchronization signal or the second sidelink synchronization signal to the UE 1204.

Figure 13:
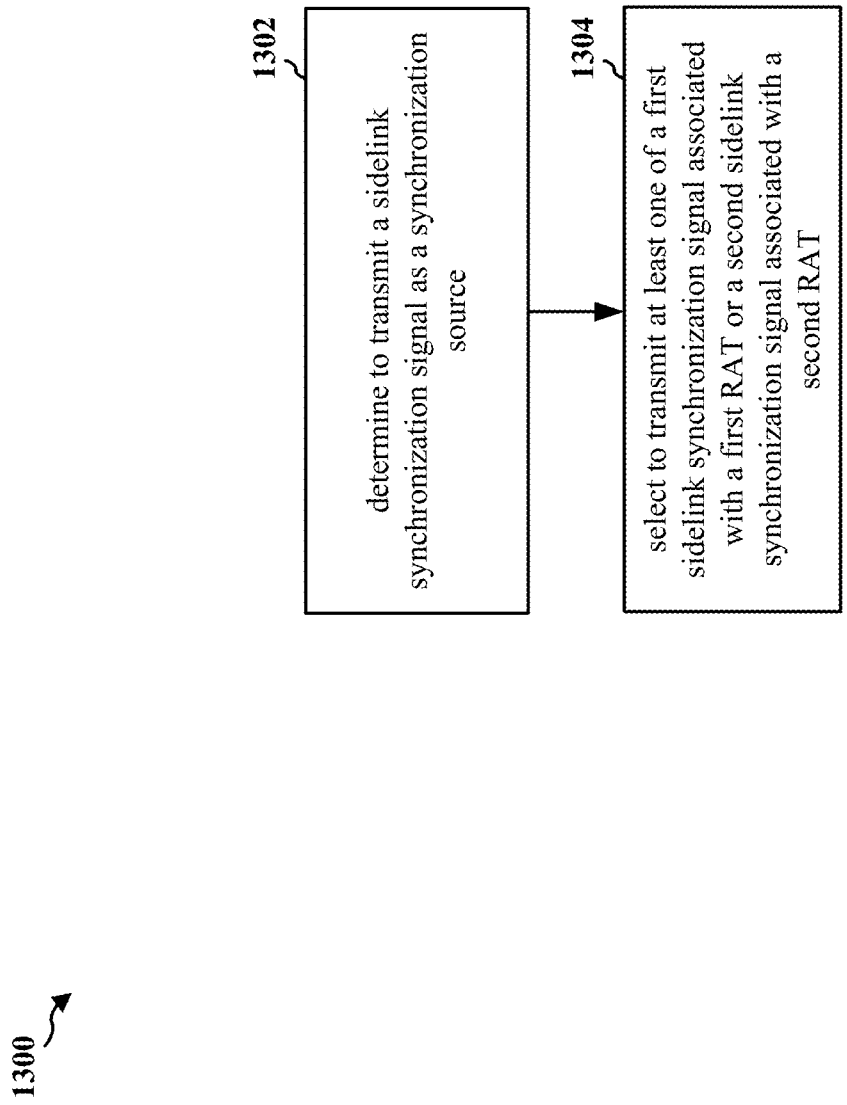
FIG. 13 is a flowchart of a method of wireless communication.

FIG. 13 is a flowchart 1300 of a method of wireless communication. The method may be performed by a UE (e.g., the UE 104; the apparatus 1504). One or more of the illustrated operations may be omitted, transposed, or contemporaneous. The method may allow a UE to efficiently prioritize synchronization transmission when different synchronization reference UEs are present.

At 1302, the UE may determine to transmit a sidelink synchronization signal. For example, 1302 may be performed by synchronization component 199 of apparatus 1504. The UE may determine to transmit a sidelink synchronization signal as a synchronization source.

At 1304, the UE may select to transmit at least one of a first sidelink synchronization signal associated with a first RAT or a second sidelink synchronization signal associated with a second RAT. For example, 1304 may be performed by synchronization component 199 of apparatus 1504. In some aspects, the first sidelink synchronization signal associated with the first RAT may be selected for transmission. The first sidelink synchronization signal associated with the first RAT may be selected for transmission in response to the first sidelink synchronization signal and the second sidelink synchronization signal operating on a same frequency band. In some aspects, selection of the first sidelink synchronization signal or the second sidelink synchronization signal may be based on a priority of the synchronization source from which the first sidelink synchronization signal and the second sidelink synchronization signal are derived. In some aspects, the first sidelink synchronization signal may be selected for transmission. The first sidelink synchronization signal may be selected for transmission in response to the first sidelink synchronization signal source having a higher timing priority than the second sidelink synchronization signal source. In some aspects, the second sidelink synchronization signal may be selected for transmission. The second sidelink synchronization signal may be selected for transmission in response to the second sidelink synchronization signal having a higher timing priority than the first sidelink synchronization signal.

Figure 14:
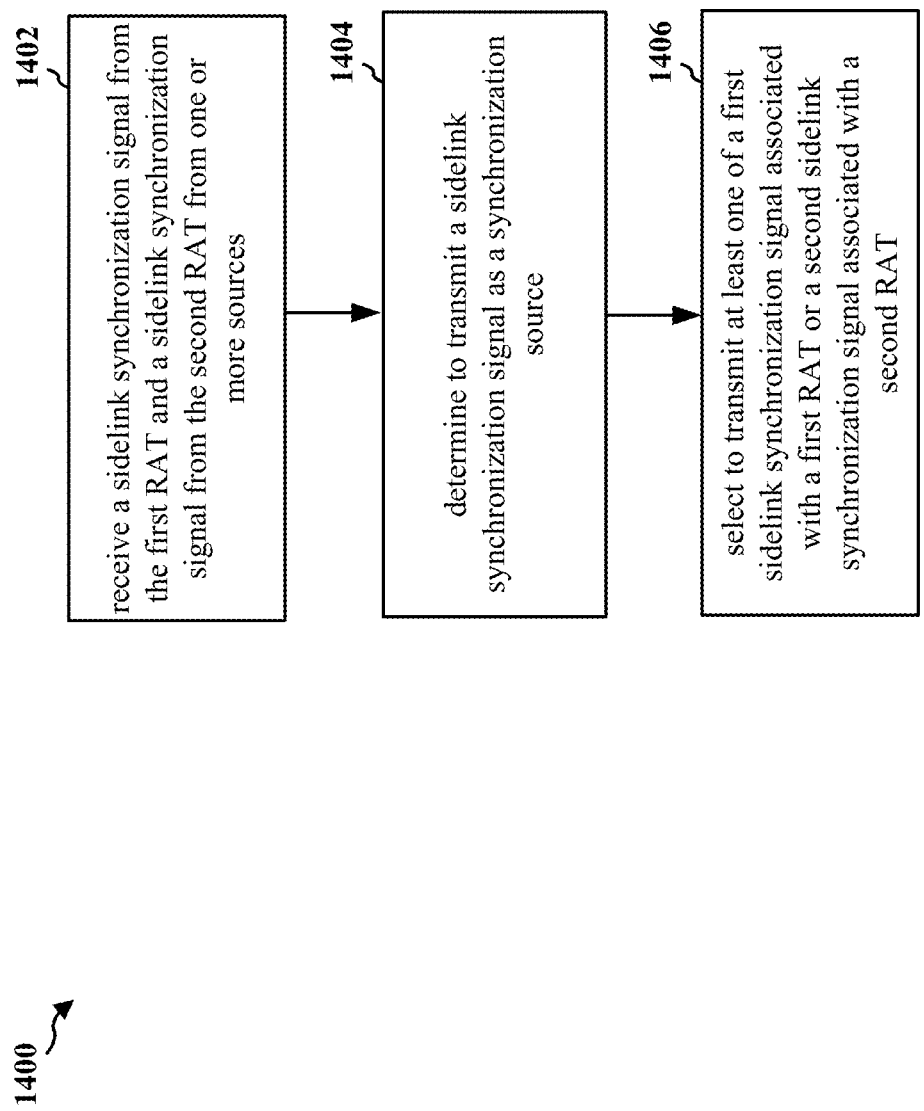
FIG. 14 is a flowchart of a method of wireless communication.

FIG. 14 is a flowchart 1400 of a method of wireless communication. The method may be performed by a UE (e.g., the UE 104; the apparatus 1504). One or more of the illustrated operations may be omitted, transposed, or contemporaneous. The method may allow a UE to efficiently prioritize synchronization transmission when different synchronization reference UEs are present.

At 1402, the UE may receive a sidelink synchronization signal from the first RAT and a sidelink synchronization signal from the second RAT. For example, 1402 may be performed by synchronization component 199 of apparatus 1504. The sidelink synchronization signal from the first RAT and the sidelink synchronization signal from the second RAT may be from one or more sources. In some aspects, a source of the second RAT may comprise a GNSS, and a source of the first RAT may be from a synchronization reference UE. In some aspects, a timing information derived from the second sidelink synchronization signal associated with the second RAT may be selected for transmission in response to a source of the sidelink synchronization signal from the second RAT having a higher priority. In some aspects, a timing information derived from the first sidelink synchronization signal associated with the first RAT may be selected for transmission in response to a source of the sidelink synchronization signal from the first RAT having a higher priority. In some aspects, the second sidelink synchronization signal associated with the second RAT may be selected for transmission. The second sidelink synchronization signal associated with the second RAT may be selected for transmission in response to an estimation of a number of UEs capable of communicating with the second RAT being above a threshold.

At 1404, the UE may determine to transmit a sidelink synchronization signal. For example, 1404 may be performed by synchronization component 199 of apparatus 1504. The UE may determine to transmit a sidelink synchronization signal as a synchronization source.

At 1406, the UE may select to transmit at least one of a first sidelink synchronization signal associated with a first RAT or a second sidelink synchronization signal associated with a second RAT. For example, 1406 may be performed by synchronization component 199 of apparatus 1504. In some aspects, the first sidelink synchronization signal associated with the first RAT may be selected for transmission. The first sidelink synchronization signal associated with the first RAT may be selected for transmission in response to the first sidelink synchronization signal and the second sidelink synchronization signal operating on a same frequency band. In some aspects, selection of the first sidelink synchronization signal or the second sidelink synchronization signal may be based on a priority of the synchronization source from which the first sidelink synchronization signal and the second sidelink synchronization signal are derived. In some aspects, the first sidelink synchronization signal may be selected for transmission. The first sidelink synchronization signal may be selected for transmission in response to the first sidelink synchronization signal source having a higher timing priority than the second sidelink synchronization signal source. In some aspects, the second sidelink synchronization signal may be selected for transmission. The second sidelink synchronization signal may be selected for transmission in response to the second sidelink synchronization signal having a higher timing priority than the first sidelink synchronization signal.

Figure 15:
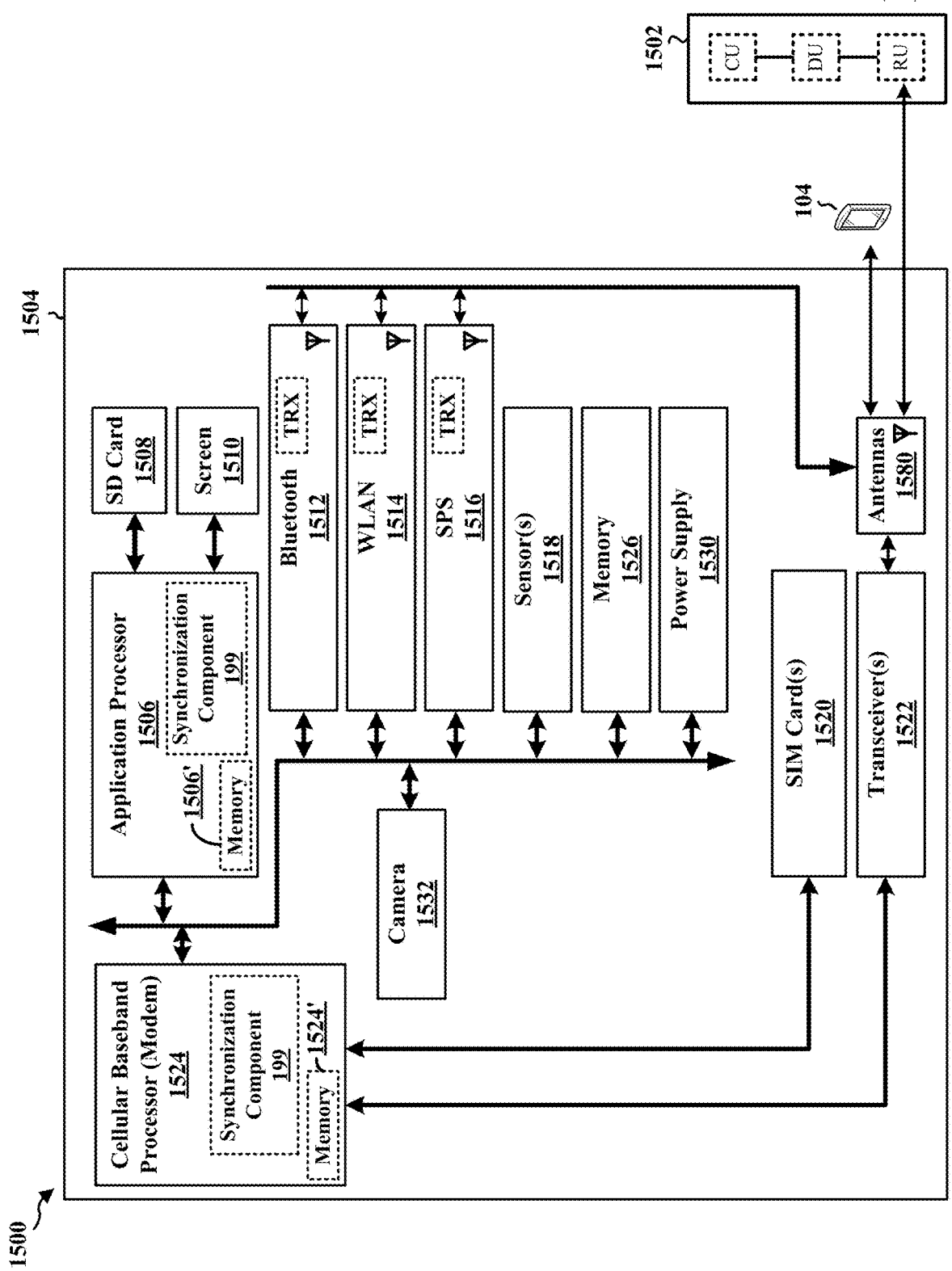
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the device 310 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 310 of FIG. 3) and include the additional modules of the apparatus 1504.

As discussed supra, the component 199 is configured to determine to transmit a sidelink synchronization signal as a synchronization source; and select to transmit at least one of a first sidelink synchronization signal associated with a first RAT or a second sidelink synchronization signal associated with a second RAT. The component 199 may be within the cellular baseband processor 1524, the application processor 1506, or both the cellular baseband processor 1524 and the application processor 1506. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for determining to transmit a sidelink synchronization signal as a synchronization source. The apparatus includes means for selecting to transmit at least one of a first sidelink synchronization signal associated with a first RAT or a second sidelink synchronization signal associated with a second RAT. The apparatus further includes means for receiving a sidelink synchronization signal from the first RAT and a sidelink synchronization signal from the second RAT from one or more sources. The means may be the component 199 of the apparatus 1504 configured to perform the functions recited by the means. As described supra, the apparatus 1504 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising detecting a first sidelink synchronization signal from a first RAT and a second sidelink synchronization signal from a second RAT; determining a priority between a synchronization source associated with the first RAT and the second RAT; and transmitting data using a timing based on a determination of the priority between the first RAT and the second RAT.

Aspect 2 is the method of aspect 1, further includes that the priority of the first RAT is higher than the priority of the second RAT.

Aspect 3 is the method of any of aspects 1 and 2, further includes that the priority of the first RAT is preconfigured or configurable.

Aspect 4 is the method of any of aspects 1-3, further includes that the timing of the first RAT is used based at least on the first sidelink synchronization signal of the first RAT derived from the synchronization source with a higher priority than a current synchronization source, wherein the current synchronization source is not a synchronization reference UE.

Aspect 5 is the method of any of aspects 1-4, further includes that the timing of the first RAT is used based at least on the synchronization reference UE is associated with the second RAT, wherein a signal strength of the first sidelink synchronization signal is greater by a first threshold than a signal strength of a sidelink SSB received from the synchronization reference UE associated with the second RAT.

Aspect 6 is the method of any of aspects 1-5, further includes that the first threshold is preconfigured or configurable.

Aspect 7 is the method of any of aspects 1-6, further includes that wherein the timing of the first RAT is used based at least on the synchronization reference UE is associated with the second RAT, wherein the second sidelink synchronization signal of the synchronization reference UE has been derived from the synchronization source with a priority that is similar or less than the priority of the first sidelink synchronization signal of the synchronization reference UE associated with the first RAT.

Aspect 8 is the method of any of aspects 1-7, further including determining to transmit a sidelink synchronization signal to be the synchronization source in response to detecting the first sidelink synchronization signal from the first RAT.

Aspect 9 is the method of any of aspects 1-8, further including determining to transmit at least one of the first sidelink synchronization signal or the second sidelink synchronization signal.

Aspect 10 is the method of any of aspects 1-9, further includes that the first sidelink synchronization signal is transmitted.

Aspect 11 is the method of any of aspects 1-10, further includes that the first sidelink synchronization signal and the second sidelink synchronization signal based at least on one of a RSRP of the first sidelink synchronization signal is less than a threshold, the timing of the second sidelink synchronization signal is not synchronized with the timing of the first sidelink synchronization signal, a previous timing of the UE is not synchronized with the timing of the first sidelink synchronization signal, or the UE is the synchronization source for other UEs.

Aspect 12 is an apparatus for wireless communication at a target UE including at least one processor coupled to a memory and at least one transceiver, the at least one processor configured to implement any of Aspects 1-11.

Aspect 13 is an apparatus for wireless communication at a target UE including means for implementing any of Aspects 1-11.

Aspect 14 is a computer-readable medium storing computer executable code, where the code when executed by a processor causes the processor to implement any of Aspects 1-11.

Aspect 15 is a method of wireless communication at a UE, comprising determining to transmit a sidelink synchronization signal as a synchronization source; and selecting to transmit at least one of a first sidelink synchronization signal associated with a first RAT or a second sidelink synchronization signal associated with a second RAT.

Aspect 16 is the method of aspect 15, further includes that the first sidelink synchronization signal associated with the first RAT is selected for transmission in response to the first sidelink synchronization signal and the second sidelink synchronization signal operating on a same frequency band.

Aspect 17 is the method of any of aspects 15 and 16, further includes that selection of the first sidelink synchronization signal or the second sidelink synchronization signal is based on a priority of the synchronization source from which the first sidelink synchronization signal and the second sidelink synchronization signal are derived.

Aspect 18 is the method of any of aspects 15-17, further includes that the first sidelink synchronization signal is selected for transmission in response to the first sidelink synchronization signal source having a higher timing priority than the second sidelink synchronization signal source.

Aspect 19 is the method of any of aspects 15-18, further includes that the second sidelink synchronization signal is selected for transmission in response to the second sidelink synchronization signal having a higher timing priority than the first sidelink synchronization signal.

Aspect 20 is the method of any of aspects 15-19, further including receiving a third sidelink synchronization signal from the first RAT and a fourth sidelink synchronization signal from the second RAT from one or more sources.

Aspect 21 is the method of any of aspects 15-20, further includes that a source of the second RAT is a GNSS, and a source of the first RAT is from a synchronization reference UE.

Aspect 22 is the method of any of aspects 15-21, further includes that a timing information derived from the second sidelink synchronization signal associated with the second RAT is selected for transmission in response to a source of the sidelink synchronization signal from the second RAT having a higher priority.

Aspect 23 is the method of any of aspects 15-22, further includes that a timing information derived from the first sidelink synchronization signal associated with the first RAT is selected for transmission in response to a source of the sidelink synchronization signal from the first RAT having a higher priority.

Aspect 24 is the method of any of aspects 15-23, further includes that the second sidelink synchronization signal associated with the second RAT is selected for transmission in response to an estimation of a number of UEs capable of communicating with the second RAT is above a threshold.

Aspect 25 is an apparatus for wireless communication at a target UE including at least one processor coupled to a memory and at least one transceiver, the at least one processor configured to implement any of Aspects 15-24.

Aspect 26 is an apparatus for wireless communication at a target UE including means for implementing any of Aspects 15-24.

Aspect 27 is a computer-readable medium storing computer executable code, where the code when executed by a processor causes the processor to implement any of Aspects 15-24.

What is claimed is:

1. An apparatus for wireless communication at a user equipment (UE), comprising:
   memory; and
   at least one processor coupled to the memory and, based at least in part on information stored in the memory, the at least one processor is configured to:
   detect a first sidelink synchronization signal from a first synchronization source associated with a first radio access technology (RAT) and a second sidelink synchronization signal from a second synchronization source associated with a second RAT;
   determine a first priority of the first sidelink synchronization signal associated with the first RAT and a second priority of the second sidelink synchronization signal associated with the second RAT based on a third priority of the first RAT and a fourth priority of the second RAT, wherein the third priority is different from the fourth priority; and
   transmit data using a timing indicated in one of the first sidelink synchronization signal or the second sidelink synchronization signal based on a higher determined priority of the one of the first sidelink synchronization signal or the second sidelink synchronization signal.

2. The apparatus of claim 1, further comprising a transceiver coupled to the at least one processor.

3. The apparatus of claim 1, wherein the third priority of the first RAT is higher than the fourth priority of the second RAT.

4. The apparatus of claim 1, wherein the third priority of the first RAT is preconfigured or configurable.

5. The apparatus of claim 1, wherein the timing indicated in the first sidelink synchronization signal is used based at least on the first sidelink-synchronization source having a higher priority than a current synchronization source, wherein the current synchronization source is not a synchronization reference UE.

6. The apparatus of claim 1, wherein the first synchronization source is a first synchronization reference UE and the second synchronization source is a second synchronization reference UE, wherein the timing indicated in the first sidelink synchronization signal is used further based at least on a first signal strength of the first sidelink synchronization signal being greater by a first threshold than a second signal strength of the second sidelink synchronization signal.

7. The apparatus of claim 6, wherein the first threshold is preconfigured or configurable.

8. The apparatus of claim 1, wherein the first synchronization source is a first synchronization reference UE and the second synchronization source is a second synchronization reference UE, wherein the determined first priority of the first sidelink synchronization signal is further based on a first identifier included in the first sidelink synchronization signal indicating a first synchronization reference and the determined second priority of the second sidelink synchronization signal is further based on a second identifier included in the second sidelink synchronization signal indicating a second synchronization reference, wherein the timing indicated in the first sidelink synchronization signal is used based at least on a sixth priority associated with the second identifier that is equal to a fifth priority associated with the first identifier and the third priority of the first RAT being higher than the fourth priority of the second RAT.

9. The apparatus of claim 1, wherein the timing indicated in one of the first sidelink synchronization signal or the second sidelink synchronization signal comprises a first timing indicated in the first synchronization signal, wherein the at least one processor is further configured to:
determine to transmit a third sidelink synchronization signal associated with the second RAT based on the first timing.

10. The apparatus of claim 9, wherein to determine to transmit the third sidelink synchronization signal, the at least one processor is further configured to determine that at least one of:
a received signal reference power (RSRP) of the first sidelink synchronization signal is less than a threshold,
a previously indicated second timing associated with the second RAT is not synchronized with the timing of the first sidelink synchronization signal,
a previous timing of the UE is not synchronized with the timing of the first sidelink synchronization signal, or
the UE is capable of being a synchronization source for other UEs.

11. A method of wireless communication at a user equipment (UE), comprising:
detecting a first sidelink synchronization signal from a first synchronization source associated with a first radio access technology (RAT) and a second sidelink synchronization signal from a second synchronization source associated with a second RAT;
determining a first priority of the first sidelink synchronization signal associated with the first RAT and a second priority of the second sidelink synchronization signal associated with the second RAT based on a third priority of the first RAT and a fourth priority of the second RAT, wherein the third priority is different from the fourth priority; and
transmitting data using a timing indicated in one of the first sidelink synchronization signal or the second sidelink synchronization signal based on a higher determined priority of the one of the first sidelink synchronization signal or the second sidelink synchronization signal.

12. The method of claim 11, wherein the timing indicated in the first sidelink synchronization signal is used based at least on the first synchronization source having a higher priority than a current synchronization source, wherein the current synchronization source is not a synchronization reference UE.

13. The method of claim 11, wherein the timing indicated in one of the first sidelink synchronization signal or the second sidelink synchronization signal comprises a first timing indicated in the first synchronization signal, the method further comprising:
determining to transmit a third sidelink synchronization signal associated with the second RAT based on the first timing to serve as a third synchronization source.

14. An apparatus for wireless communication at a user equipment (UE) capable of transmitting a first sidelink synchronization signal associated with a first radio access technology (RAT) and a second sidelink synchronization signal associated with a second RAT, comprising:
memory; and
at least one processor coupled to the memory and, based at least in part on information stored in the memory, the at least one processor is configured to:
detect a third sidelink synchronization signal from a first synchronization source associated with the first RAT and a fourth sidelink synchronization signal from a second synchronization source associated with the second RAT;
determine to transmit a sidelink synchronization signal as a synchronization source; and
transmit one of the first sidelink synchronization signal associated with the first RAT or the second sidelink synchronization signal associated with the second RAT based on a first priority of the first RAT and a second priority of the second RAT, wherein the first priority is different from the second priority.

15. The apparatus of claim 14, further comprising a transceiver coupled to the at least one processor.

16. The apparatus of claim 14, wherein to transmit the one of the first sidelink synchronization signal associated with the first RAT or the second sidelink synchronization signal associated with the second RAT, the at least one processor is configured to transmit the first sidelink synchronization signal associated with the first RAT for transmission, wherein the first priority is higher than the second priority and the first sidelink synchronization signal and the second sidelink synchronization signal operate on a same frequency band.

17. The apparatus of claim 14, wherein to transmit the one of the first sidelink synchronization signal associated with the first RAT or the second sidelink synchronization signal associated with the second RAT, the at least one processor is configured to transmit the one of the first sidelink synchronization signal or the second sidelink synchronization signal further based on a third priority of the first synchronization source from which the third sidelink synchronization signal is detected and a fourth priority of the second synchronization source from which the fourth sidelink synchronization signal is detected.

18. The apparatus of claim 17, wherein to transmit the one of the first sidelink synchronization signal associated with the first RAT or the second sidelink synchronization signal associated with the second RAT, the at least one processor is configured to transmit the first sidelink synchronization signal for transmission in response to the third priority being higher than the fourth priority.

19. The apparatus of claim 17, wherein to transmit the one of the first sidelink synchronization signal associated with the first RAT or the second sidelink synchronization signal associated with the second RAT, the at least one processor is configured to transmit the second sidelink synchronization signal for transmission in response to the fourth priority being higher than the third priority.

20. The apparatus of claim 19, wherein the second synchronization source is a GNSS, and the first synchronization source is a synchronization reference UE.

21. The apparatus of claim 16, wherein the first sidelink synchronization signal associated with the first RAT includes a timing information derived from the fourth sidelink synchronization signal associated with the second RAT, wherein a fourth priority of the second synchronization source is higher than a third priority of the first synchronization source.

22. The apparatus of claim 19, wherein the second sidelink synchronization signal associated with the second RAT includes a timing information derived from the third sidelink synchronization signal associated with the first RAT, wherein the third priority of the first synchronization source is higher than the fourth priority of the second synchronization source.

23. The apparatus of claim 14, wherein to transmit the one of the first sidelink synchronization signal associated with the first RAT or the second sidelink synchronization signal associated with the second RAT, the at least one processor is configured to transmit the second sidelink synchronization signal associated with the second RAT for transmission in response to an estimation of a number of UEs capable of communicating with the second RAT that is above a threshold, wherein timing information included in the second sidelink synchronization signal is associated with one of the third sidelink synchronization signal or the fourth sidelink synchronization signal.

24. A method of wireless communication at a user equipment (UE) capable of transmitting a first sidelink synchronization signal associated with a first radio access technology (RAT) and a second sidelink synchronization signal associated with a second RAT, comprising:
  detecting a third sidelink synchronization signal from a first synchronization source associated with the first RAT and a fourth sidelink synchronization signal from a second synchronization source associated with the second RAT;
  determining to transmit a sidelink synchronization signal as a synchronization source; and
  transmitting one of the first sidelink synchronization signal associated with the first RAT or the second sidelink synchronization signal associated with the second RAT based on a first priority of the first RAT and a second priority of the second RAT, wherein the first priority is different from the second priority.

25. The method of claim 24, wherein transmitting the one of the first sidelink synchronization signal associated with the first RAT or the second sidelink synchronization signal associated with the second RAT comprises transmitting the first sidelink synchronization signal associated with the first RAT for transmission, wherein the first priority is higher than the second priority and the first sidelink synchronization signal and the second sidelink synchronization signal operate on a same frequency band.

* * * * *